United States Patent Office 2,794,475
Patented June 4, 1957

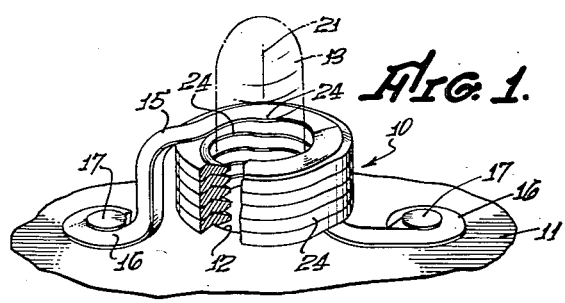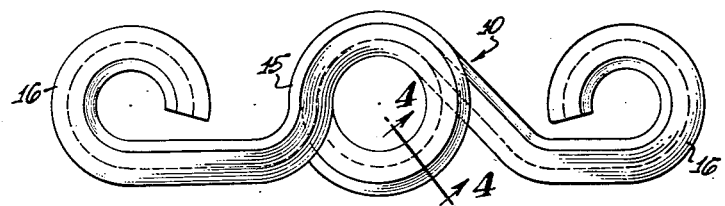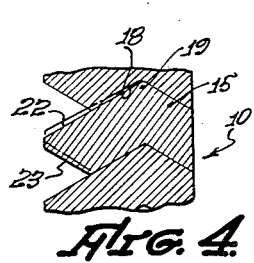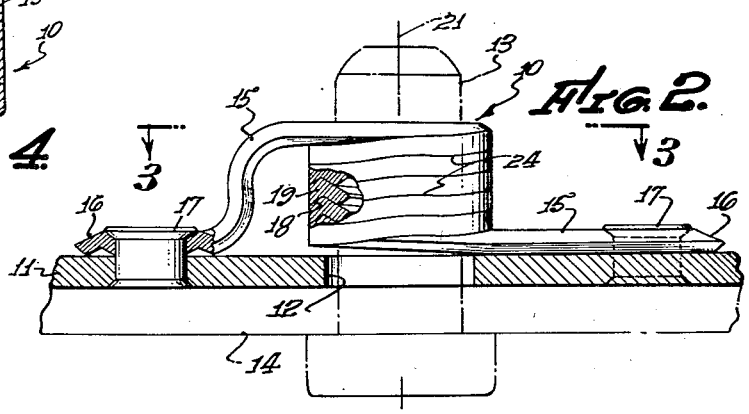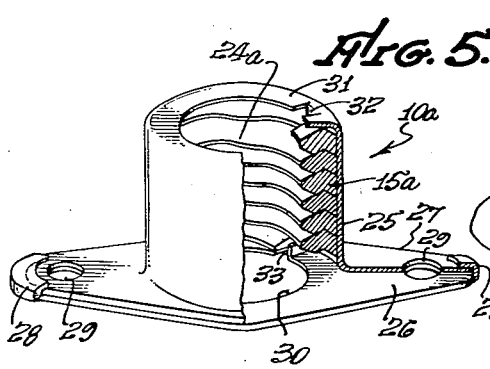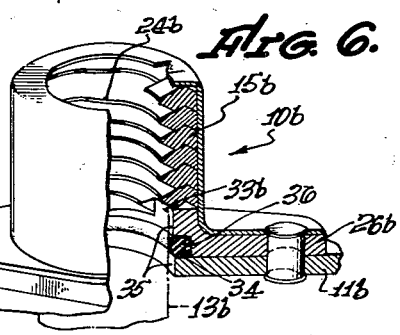
INVENTOR.
FRANK A. PACHMAYR,
BY William P. Green
ATTORNEY.

2,794,475

COILED SPRING LOCK NUT HAVING WORK-PIECE ATTACHING MEANS FORMED THEREON

Frank A. Pachmayr, Culver City, Calif.

Application October 13, 1955, Serial No. 540,298

6 Claims. (Cl. 151—14)

This invention relates to improved nuts for forming a threaded connection with a screw or stud and particularly adapted in certain respects for use as lock nuts.

In Patent No. 2,464,808 issued March 22, 1949, to Mark Hatton, entitled "Self-Locking Nut," there has been disclosed a type of lock nut including a helically coiled spring which is contained within and carried by a small tubular housing. The spring is confined and retained by the housing, and functions as a resilient thread for threadedly engaging a coacting stud. The resilience of the spring is utilized to provide a gripping action for tightly frictionally engaging the stud, to give the device a lock nut action.

The general object of the present invention is to provide improvements in the above discussed general type of lock nut, and particularly to provide an arrangement in which the helical spring element has, in itself, a considerably increased resistance to unwanted deformation, especially to radial spreading or expansion. This increased inherent stability of the spring element allows for either the complete elimination of the outer housing element, or the substitution of a much lighter housing element than has heretofore been employed, since the housing no longer has to be heavy enough to resist a strong expanding force exerted by the spring when the stud and nut are tightened.

In order to attain such added spring stability, I so form the spring that its adjacent turns will nest axially together, in a manner interlocking the turns against relative radial movement. That is, each turn may have a projection extending axially into a mating recess in an adjacent turn, and adapted to bear radially against a wall or walls of the recess to radially interlock the turns. Thus, each turn is held against expansion by the other turns, and the overall result is a very stable unit which is capable of withstanding spreading and other distorting forces without being confined within an outer housing.

To allow for maximum effectiveness of the interlock between turns, and to facilitate formation of the spring, the interfitting projection and recess preferably extend helically along the coiled spring member, and desirably along its entire helical extent. The projection may be formed at one axial side of the coiled element, while the recess is at the other side. Particularly contemplated is an arrangement in which the coiled spring element is of essentially V-shaped cross sectional configuration, to present a V-shaped projection at one side and a correspondingly shaped recess at the other side.

The gripping action on an engaged stud may be enhanced by providing the various turns of the spring with axially waving portions, which are deformed to a more truly helical configuration by engagement with the stud threads, and consequently bear tightly against the stud threads to produce a lock nut effect. When no housing is employed for the spring, the latter may have its ends turned laterally and shaped to form eyelets for attaching the nut to a mounting plate.

The above and other features and objects of the present invention will be better understood from the following detailed description of the typical embodiments illustrated in the accompanying drawings in which:

Fig. 1 is a perspective view of a lock nut constructed in accordance with the invention;

Fig. 2 is an enlarged axial section taken through the nut of Fig. 1;

Fig. 3 is a plan view taken on line 3—3 of Fig. 2;

Fig. 4 is a further enlarged fragmentary view showing the manner in which the individual turns of the thread forming helical element may be slightly deformed in use;

Fig. 5 is a perspective view, partially broken away, of a variational form of lock nut embodying the invention, and Fig. 6 is a similar view of a further variational form of lock nut.

Referring first to Figs. 1 to 4, the lock nut 10 is shown applied to a plate 11 which contains an opening 12 through which a threaded stud 13 projects for threadedly connecting to the nut. Stud 13 may typically be utilized for attaching a plate 14 or other element to the outer side of the plate 11 which carries nut 10.

The nut of Figs. 1 to 4 is formed of a single elongated strip or wire 15 wound helically as shown at a pitch corresponding substantially to the pitch of the threads of stud 13, so that helical element 15 itself functions as a thread for engaging the stud threads. The coil formed by element 15 is closely wound, having its adjacent turns in direct axially abutting engagement, and is formed of a resilient spring material, such as a suitable stainless steel or spring type carbon steel. The two ends of the element or wire 15 are turned laterally to form a pair of circular loops 16 which are attached by rivets 17 to plate 11 at opposite sides of its stud passing opening 12, to thus rigidly attach nut 10 to the plate.

In order to effectively maintain the various turns of helical element 15 against relative radial movement, and particularly against spreading or expanding movement radially outwardly under the influence of the forces exerted against the coiled member when stud 13 is tightened, the element 15 is given a cross sectional configuration which allows each turn to nest axially within the next successive or adjacent turn and thus hold the turns in their desired interfitting relation. As best seen in Fig. 2, element 15 may have a substantially V-shaped cross sectional configuration, which is desirably the same along the entire length of element 15, so that each turn of this helical element has at one side a V-shaped axially facing recess 18 extending longitudinally of the elongated thread forming element 15. At the opposite axial side of each turn of element 15, this V-shaped element forms an axially extending projection 19 which is shaped substantially the same as recess 18, and fits into that recess of the adjacent turn in nesting relation. This projection 19 on each turn of the coiled element is adapted to bear both radially inwardly and radially outwardly against the inner and outer walls of the V-shaped recess into which the projection fits, so that the adjacent turns are not free to move relatively in either radial direction.

The radially outer sides of the various turns of element 15 may be shaped to form together an outer cylindrical surface centered about the axis 21 of the nut. The radially inner extremities of the various turns of coiled element 15 are shaped in correspondence with the threads of the mating stud 13, to form together an inner threaded bore through the nut into which the stud may be screwed. More particularly, the threads of the nut may be formed by two angularly disposed surfaces 22 and 23, the former of which may be an inner continuation of one of the sides of projection 19, and the latter of which may be a surface extending angularly inwardly from the inner extremity of one of the walls of recess 18. Thread surfaces 22 and 23, in tapering radially inwardly to the peaks 23a of the threads, may be disposed at the usual angle of 60° relative to each other. If desired, element 15 may be so formed that the load bearing surfaces 22 of the nut threads will be at a very slightly greater angle to axis 21 than are the surfaces 23, so that the turns of element 15 may be slightly resiliently deformed downwardly when stud 13 is tightened, to then cause the stud and nut threads to mesh perfectly. This slight deformation is represented in Fig. 4, in which the broken lines represent the position to which one of the turns of element 15 normally returns under its own resilience, while the full lines represent the position to which the thread element is slightly deformed when in use.

The element 15 desirably has at least about six turns. The material of this element must of course be sufficiently strong and resistant to deformation to maintain the threaded connection with stud 13 under the forces exerted against the nut by the stud when the former is tightened. In order that the nut may serve to grip the stud threads very tightly in the manner of a lock nut, the various turns of element 15 are given an axially waving configuration, longitudinally of the elongated helical element 15, and in addition to its helical curvature. This waving configuration is brought out best in Fig. 2. As seen in that figure, the individual turns are deformed to wave axially at 24 out of the true helical path defined by the stud threads, so that the helical threads of the stud tend to deform the waves in element 15 from their waving configuration to a true helical course. The resilience of the various turns of element 15, however, always urges the initially waved portions of those turns back toward their waved condition, so that these waving areas resiliently bear tightly against the engaged thread surfaces on the stud, to cause a tight holding action between the stud and nut.

Desirably, the waves in the various turns of element 15 are all identical and alined axially of the nut, so that the waved portions of the nut turns will nest one within the other. There may typically be four waves formed in each turn of the coil.

In using the nut 10 of Figs. 1 to 4, stud 13 may be screwed into the nut to retain element 14 against plate 11 to which the nut is attached. The resilience of element 15, together with the axially waving configuration of the turns of that element, cause the various turns to tightly bear against the stud threads and functions as a lock nut for holding the stud in any position to which it is turned. The nesting or interfitting relationship between the various axially adjacent turns of element 15 causes those turns to interfit in a manner preventing their expansion or relative radial movement either prior to insertion of the stud, or while the stud is connected to the nut. Such accurate relative positioning of the turns of element 15 is particularly important when stud 13 is tightened, in order to prevent such tightening of the stud from camming the engaged thread forming turns of element 15 radially outwardly to positions in which the threaded connection between the stud and nut might be broken. In order to effectively retain the successive turns of element 15 against relative radial displacement, the projection 19 of each turn should of course project rather far into the recess 18 of the adjacent turn, preferably to a location substantially directly radially opposite the peak 23a of that adjacent turn, as seen clearly in Fig. 4.

Fig. 5 represents a variational form of lock nut 10a including a helically coiled spring element 15a which may be formed identically with element 15 of Fig. 1, except that the ends of the element are not turned laterally to form the loops 16 for attaching the element to a mounting plate. Instead, the coiled element 15a, of Fig. 5 is attached to the plate by means of a thin metal housing formed of two sections 25 and 26. Housing section 25 is tubular, and has a base flange 27 which extends across the upper side of the lower base plate section 26 of the housing. The latter may have a pair of ears 28 turned over opposite end portions of flange 27, to fasten the two body sections together. Apertures 29 in flange 27 and plate 26 are provided for passing rivets to attach the nut unit to a carrying plate 11a. At its lower end, coiled element 15a rests against an inner portion of base plate 26 adjacent the central stud passing opening 30. At its upper end, element 15a is confined axially by an inturned annular flange portion 31 of upper housing section 25. Element 15a is free for only very limited rotary movement within housing part 25, this rotary movement being limited by engagement of the opposite ends of coiled element 15a with two axially turned ears 32 and 33 formed by housing parts 25 and 26 respectively.

Coiled element 15a has the same cross sectional configuration as element 15 of Fig. 1, so that the adjacent turns of this coiled member may axially nest together in a manner preventing their relative radial movement or expansion. Also, member 15a is provided with axially waving deformations 24a corresponding to those shown at 24 in Figs. 1 and 2. In use, a stud is threaded into nut 10a, and the coiled element 15a acts to threadedly engage the stud and to form a very tight connection with it in the manner of a lock nut.

Fig. 6 represents another form of lock nut 10b, which is the same as that of Fig. 5 except as to the manner of formation of the lower base plate section 26b of the nut housing. In Fig. 6, this base plate 26b is a forging or casting, on which the upturned ear 33b for limiting rotation of element 15b is made considerably heavier than the ear 33 of Fig. 5. Also, base plate 26b of Fig. 6 has an annular recess 34 containing an elastically deformable seal ring or O-ring 36 formed of rubber or the like, which seal ring projects inwardly beyond the radially inner cylindrical surfaces 35 of plate 26b and mounting plate 11b to a diameter to engage and form a fluid tight seal with an outer cylindrical surface 27 on stud 13b. Ring 36 also annularly engages parts 26b and 11b in fluid tight sealing relation.

I claim:

1. A lock nut comprising an elongated helically coiled member of resilient spring material having an inner portion forming a helical internal thread adapted to threadedly engage a coacting stud and tapering radially inwardly toward an inner peak portion of the thread, said member having an elongated axially facing recess extending helically along one axial side thereof, and said member having an elongated projection extending helically along the opposite axial side, said projection of one turn of the coiled member projecting axially into said recess of the adjacent turn to interlock the turns against relative radial displacement, said elongated helically coiled member having opposite ends turned laterally beyond the coiled portion of the member and adapted to be attached to a carrier structure for mounting the member thereto.

2. A lock nut comprising an elongated helically coiled member of resilient spring material having an inner portion forming a helical internal thread adapted to threadedly engage a coacting stud and tapering radially inwardly toward an inner peak portion of the thread, said member having an elongated axially facing recess extending helically along one axial side thereof, and said member having an elongated projection extending helically along the opposite axial side, said projection of one turn of the coiled member projecting axially into said recess of the adjacent turn to a location substantially directly radially opposite said peak portion of said adjacent turn to interlock the turns against relative radial displacement, said elongated helically coiled member having opposite ends turned laterally beyond the coiled portion of the member and adapted to be attached to a carrier structure for mounting the member thereto.

3. A lock nut comprising an elongated helically coiled member of resilient spring material having an inner portion forming a helical internal thread adapted to threadedly engage a coacting stud and tapering radially inwardly toward an inner peak portion of the thread, said member having an elongated axially facing recess extending helically along one axial side thereof, and said member having an elongated projection extending helically along the opposite axial side, said projection of one turn of the coiled member projecting axially into said recess of the adjacent turn to a location substantially directly radially opposite said peak portion of said adjacent turn to interlock the turns against relative radial displacement, said elongated helically coiled member having opposite ends turned laterally beyond the coiled portion of the member and forming two loops at the side of said coiled portion for receiving fasteners to attach the member to a carrier plate.

4. A lock nut as recited in claim 2, in which the different turns of said coiled member have portions which wave axially as they extend helically, said waving portions of the different turns being in axial alinement to fit one within the other.

5. A lock nut comprising an elongated helically coiled member of resilient spring material having an inner portion forming a helical internal thread adapted to threadedly engage a coacting stud and tapering radially inwardly toward an inner peak portion of the thread, said member having an elongated axially facing recess extending helically along one axial side thereof, and said member having an elongated projection extending helically along the opposite axial side, said projection of one turn of the coiled member projecting axially into said recess of the adjacent turn to a location substantially directly radially opposite said peak portion of said adjacent turn to interlock the turns against relative radial displacement, said elongated helically coiled member having opposite ends turned laterally beyond the coiled portion of the member and forming two loops at the side of said coiled portion for receiving fasteners to attach the member to a carrier plate, said coiled member being of uniform essentially V-shaped cross section along its entire length including said end portions thereof, and said projection and recess being of substantially V-shaped and substantially identical cross section.

6. A lock nut comprising an elongated helically coiled member of resilient spring material having an inner portion forming a helical internal thread adapted to threadedly engage a coacting stud and tapering radially inwardly toward an inner peak portion of the thread, said member having an elongated axially facing recess extending helically along one axial side thereof, and said member having an elongated projection extending helically along the opposite axial side, said projection of one turn of the coiled member projecting axially into said recess of the adjacent turn to a location substantially directly radially opposite said peak portion of said adjacent turn to interlock the turns against relative radial displacement, said elongated helically coiled member having opposite ends turned laterally beyond the coiled portion of the member and forming two loops at the side of said coiled portion for receiving fasteners to attach the member to a carrier plate, said coiled member being of uniform essentially V-shaped cross section along its entire length including said end portions thereof, and said projection and recess being of substantially V-shaped and substantially identical cross section, the different turns of said coiled member having portions which wave axially as they extend helically, said waving portions of the different turns being in axial alinement to fit one within the other.

References Cited in the file of this patent

UNITED STATES PATENTS

| | | |
|---|---|---|
| 2,121,784 | Busby | June 28, 1938 |
| 2,186,746 | Albin | Jan. 9, 1940 |
| 2,464,808 | Hattan | Mar. 22, 1949 |
| 2,672,070 | Forster | Mar. 16, 1954 |